(12) United States Patent
Tani

(10) Patent No.: US 8,690,346 B2
(45) Date of Patent: Apr. 8, 2014

(54) PROJECTION DISPLAY APPARATUS INCLUDING WIND OUTLETS FOR COOLING OPTICAL PART

(75) Inventor: Yusuke Tani, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 754 days.

(21) Appl. No.: 12/736,680

(22) PCT Filed: May 22, 2008

(86) PCT No.: PCT/JP2008/059434
§ 371 (c)(1),
(2), (4) Date: Oct. 29, 2010

(87) PCT Pub. No.: WO2009/141908
PCT Pub. Date: Nov. 26, 2009

(65) Prior Publication Data
US 2011/0043769 A1    Feb. 24, 2011

(51) Int. Cl.
*G03B 21/16* (2006.01)
*G03B 21/26* (2006.01)
*G03B 21/00* (2006.01)

(52) U.S. Cl.
USPC ............................... 353/57; 353/52; 353/31

(58) Field of Classification Search
USPC ........ 353/52, 57–61, 30, 31; 349/1, 5–10, 72, 349/193; 359/237, 245, 315, 322
See application file for complete search history.

(56) References Cited

U.S. PATENT DOCUMENTS

| | | | |
|---|---|---|---|
| 6,334,686 B1 * | 1/2002 | Shiraishi et al. | 353/57 |
| 6,481,854 B1 | 11/2002 | Sugawara et al. | |
| 7,118,223 B2 * | 10/2006 | Suzuki | 353/61 |
| 7,934,839 B2 * | 5/2011 | Noda | 353/61 |
| 2005/0036115 A1 * | 2/2005 | Kim et al. | 353/61 |
| 2010/0033687 A1 | 2/2010 | Utsunomiya | |

FOREIGN PATENT DOCUMENTS

| | | |
|---|---|---|
| DE | 200 18 447 U1 | 1/2001 |
| JP | 6-148594 A | 5/1994 |
| JP | 11-295814 A | 10/1999 |
| JP | 2000194073 A | 7/2000 |
| JP | 2000-231154 A | 8/2000 |
| JP | 2001-209126 A | 8/2001 |
| JP | 2004-4942 A | 1/2004 |
| JP | 2004-61894 A | 2/2004 |

(Continued)

OTHER PUBLICATIONS

European Search Report dated Apr. 2, 2013.

(Continued)

*Primary Examiner* — Pascal M Bui Pho
(74) *Attorney, Agent, or Firm* — McGinn IP Law Group, PLLC

(57) ABSTRACT

The object of the invention is to realize highly efficient cooling by enhancing the heat transfer rate between optical parts and cooling air, and by simultaneously lowering the temperature of atmosphere around the optical parts. For this purpose, a first wind outlet for blowing a cooling wind is provided so as to allow the cooling wind to pass through optical parts, and furthermore, a second wind outlet for blowing another cooling wind so as to interfere with the cooling wind from the first wind outlet at the optical parts is provided at a location different from that of the first wind outlet.

3 Claims, 10 Drawing Sheets

(56) References Cited

FOREIGN PATENT DOCUMENTS

| | | | |
|---|---|---|---|
| JP | 2008-107387 A | 5/2008 | |
| WO | WO2008/050660 * | 5/2008 | ............. G03B 21/16 |
| WO | WO 2008/050660 A2 | 5/2008 | |

OTHER PUBLICATIONS

Chinese Office Action dated Apr. 27, 2012, with English-language translation.
European Search Report dated Jul. 12, 2012.
Chinese Office Action issued on Oct. 21, 2011, with English translation.
Chinese Office Action dated Nov. 29, 2012 with English translation.
Decision of Rejection dated Apr. 15, 2013, with English translation.
Japanese Office Action dated Mar. 2, 2011, with partial English translation.
European Search Report dated Oct. 12, 2011.

* cited by examiner

PROJECTION DISPLAY APPARATUS INCLUDING WIND OUTLETS FOR COOLING OPTICAL PART

TECHNICAL FIELD

The present invention relates to a cooling structure for an optical part, and a projection display apparatus including the same.

BACKGROUND ART

Enhancing the brightness and increasing the miniaturization of projection display apparatuses leads to a steady increase in the heat densities of optical parts.

Organic optical materials are used for many optical parts of projection display apparatuses, and there is a strong correlation between the operating temperature and deterioration of the display apparatuses. For example, in a liquid crystal type projection display apparatus, a liquid crystal panel, a polarizing plate and an optical compensation plate are used for a liquid crystal panel unit, a polarization beam splitter (PBS) is used for an illumination optical part, and when the temperature of these parts is high, this causes early deterioration of these parts. More specifically, in order to exhibit a desired optical performance and to maintain performance continuously in projection display apparatuses, suppression of temperature rise by cooling means is important.

The cooling means for these optical parts includes a forced-air-cooling type using an air-cooling fan, and a liquid-cooling type using a liquid circulating pump. In order to enhance cooling capacity by using a forced-air-cooling type, the rotational frequency of the fan needs to be increased, and thus noise increases. Further, even if the rotational frequency of the fan is increased, wind velocity does not rise due to wind resistance, and thus improvement in the cooling capacity is limited. Meanwhile, the liquid cooling type has advantages in which the operation noise of the liquid circulating pump is small and the cooling capacity is large, but has the disadvantage in which the operation system, such as piping for liquid circulation, is massive and complicated.

Therefore, many of the projection display apparatuses adopt forced-air-cooling types, and the arts are disclosed in the following Patent Documents 1, 2 and 3.

Patent Document 1 (JP11-295814A) discloses the art of cooling a liquid crystal panel by providing a wind direction plate at a lower portion at the liquid crystal panel side, having a color synthesis prism, and sending forth the wind by a cooling fan in the liquid crystal panel direction. The art has the problem in which the wind direction plate is essential and since installation of the wind direction plate increases wind resistance, the wind velocity is reduced. Further, in a compact projection display apparatus, the liquid crystal panel and the color synthesis prism are close to each other, and therefore, adoption of the art is difficult.

Patent Document 2 (JP2004-61894A) discloses the art of realizing cooling even when the space from a polarizing plate is small by securing a wind passage by providing a cutout portion in the holding frame of a liquid crystal panel. The art has the advantage of not requiring a composition member that is not related to the optical function, such as the wind direction plate disclosed in the above described Patent Document 1, but has the problem in which wind velocity is reduced due increased wind resistance, as in Patent Document 1. Further, the art also has the problem in which the cooling capacity of an analyzer is sacrificed.

The invention disclosed in Patent Document 3 (JP2001-209126A) prevents inclusion of dust into the liquid crystal panel part from outside by encasing the entire liquid crystal panel. In this invention, the liquid crystal panel part is cooled with wind distributed by a first cooling fan, and thereafter, the air after being cooled is heat-exchanged by the wind by a second cooling fan that is provided outside. However, in the projection display apparatuses of recent years, the amount of heat that is generated by the liquid crystal panel parts is large and the heat-exchange efficiency is low, therefore even the temperature of the air in the projection display apparatuses is cooled, the temperature cannot revert to the original temperature (the temperature at the time of starting the display operation). As a result, in the apparatus disclosed in Patent Document 3, circulation of the cooling wind is repeated inside, and therefore, a temperature rise occurs. In order to solve the problem, a large radiator plate and a high-performance second cooling fan need to be provided, but the cost is increased and the entire projection display apparatus increases in size.

In the arts disclosed in the above Patent Documents 1 to 3 and the like, wind is blown from one specific direction to the optical parts, and the direction in which the wind is blown is forcibly change by adding a wind direction plate and as a result of contrivance of the shape to the existing structures.

Therefore, even if further enhancement of the cooling capacity is planned, due to a significant increase in noise, or an increase in wind resistance, enhancement of the cooling capacity is inhibited. Similar problems occur even if the size of the blowout port is reduced in order to enhance the wind velocity at the cooling wind blowout port of the duct.

Further, even if the size of the projecting display apparatus is increased and is mounted with a high performance cooling fan, and even if a rise in wind velocity, which overcomes any increase in wind resistance, is realized, the amount of temperature reduction of the optical parts will gradually decreases with respect to the rising amount of wind velocity, and therefore cooling efficiency will be lowered. In order to avoid this phenomenon and reduce the temperature of the optical parts, it is necessary to enlarge the heat radiation area of the heat generation surface, or raise the heat transfer rate.

DISCLOSURE OF THE INVENTION

An object of the present invention is to provide a cooling structure for an optical part capable of solving at least one of the problems in the above described background art, and a projection display apparatus including the same.

An example of the object is to provide a projection display apparatus which realizes high efficient cooling by enhancing the heat transfer rate between optical parts and cooling air, and by simultaneously lowering the temperature of the atmosphere around the optical parts. Further, an example of the object is to achieve noise, size and weight reduction, to extend the life cycle of the optical parts and to enhance their reliability by realizing highly efficient cooling.

One mode of the present invention relates to a structure which blows a cooling wind to cool an optical part. The cooling structure includes a first wind outlet for sending forth the cooling wind so as to allow the cooling wind to pass through the optical part. The cooling structure further includes a second wind outlet for blowing a cooling wind so as to allow the cooling wind to interfere with the cooling wind from the aforesaid first wind outlet at the aforesaid optical part, at a location different from that of the first wind outlet.

DESCRIPTION OF SYMBOLS

Figure 1:
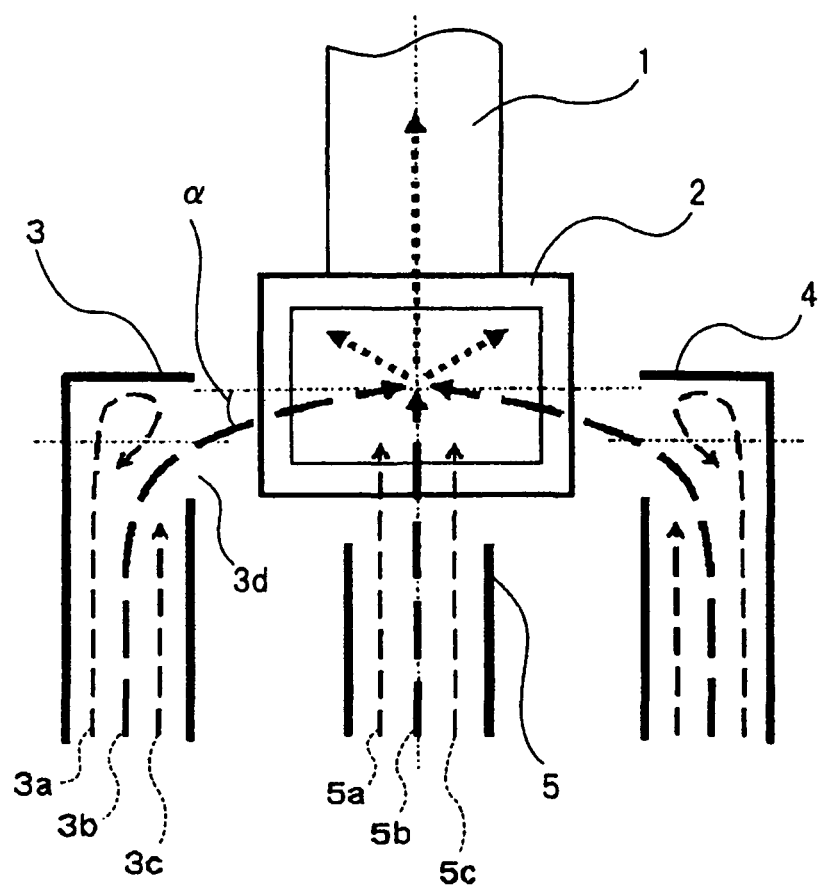
FIG. 1 is a sectional view showing a cooling duct when a liquid crystal panel is seen from an optical axis direction (light transmitting direction) to explain the concept of the present invention.

1: flexible substrate
2a, 2b, 2c: liquid crystal panel
3, 4, 7, 8, 9, 13a, 13b: smokestack duct
3a, 3b, 3c, 5a, 5b, 5c, 7a, 7b, 7c: wind flow
7d: side wall
10: optical engine
11: projection lens
12a, 12b, 12c: sirocco fan
13, 15: wind duct
13c, 13d1, 13d2, 13d3, 13e1, 13e2, 13e3, 13e4: wind outlet (opening)
15d1, 15d2, 15e1, 15e2, 15f1, 15f2: opening (wind outlet)
61, 62: polarizing plate

Best Mode for Carrying Out the Invention

Hereinafter, the present invention will be described concretely with reference to the drawings. The expressions assigned with "upper" and "lower" in the present description means "upper" and "lower" with respect to the gravity direction.

First, the concept of the present invention will be described with the use of FIGS. 1 and 2.

FIG. 1 is a section of a cooling duct when liquid crystal panel 2 that is a planar optical part is seen from an optical axis direction (light transmitting direction), and wind routes of the cooling wind to liquid crystal panel 2 are shown by the dotted lines. Liquid crystal panel 2 exchanges a drive signal with flexible substrate 1 connected to an upper portion.

Figure 2:
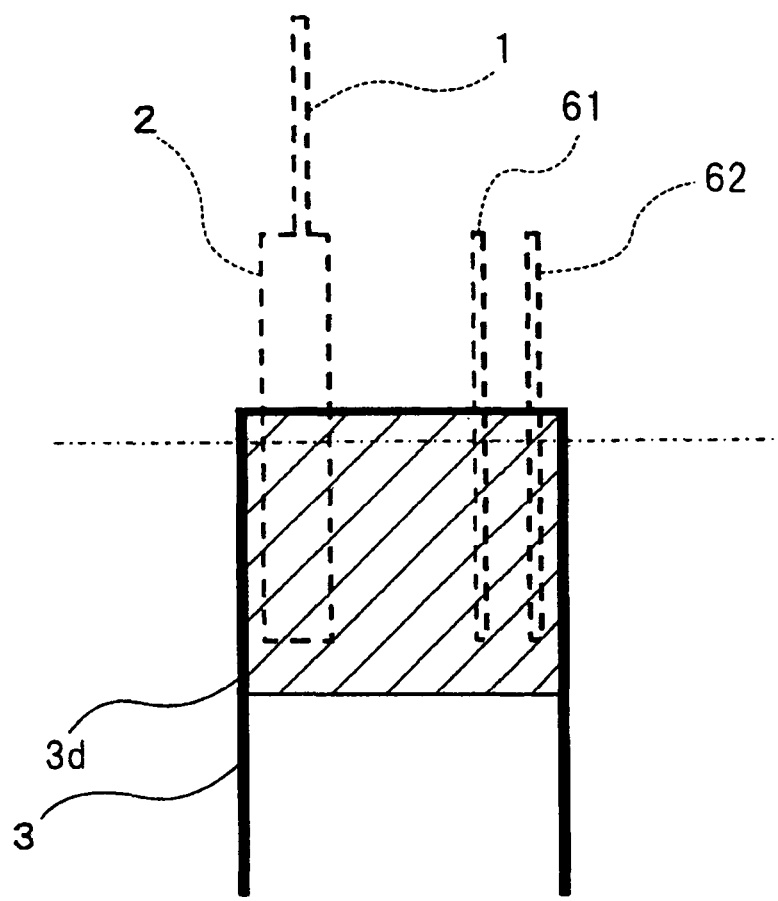
FIG. 2 is a view of an opening of a cooling duct disposed at both left and right sides of the liquid crystal panel of FIG. 1, seen from the side of the liquid crystal panel.

FIG. 2 is a view of opening 3d at a side surface of a smokestack-shaped duct (smokestack duct 3) disposed at each of both the left and right sides of liquid crystal panel 2 of FIG. 1, seen from the side of liquid crystal panel 2. A region of the opening extends not only an end surface of liquid crystal panel 2 but also an end surface of an entire liquid crystal panel unit that includes optical parts such as polarizing plates 61 and 62 disposed to be opposed to liquid crystal panel 2.

The present invention cools the liquid crystal panel from three directions as shown in FIG. 1, for example. More specifically, a cooling wind is blown from a lower side of liquid crystal panel 2 by duct 5, and is allowed to pass through a center of liquid crystal panel 2. Furthermore, by smokestack ducts 3 and 4 which are extended to an upper portion from a lower portion of both the left and right sides of the liquid crystal panel, cooling winds are blown to the center of liquid crystal panel 2 from both the left and right sides of liquid crystal panel 2.

In order to enable wind to be blown to the center of the liquid crystal panel from the smokestack ducts, centers of openings (wind outlets) formed in side surfaces of upper portions of smokestack ducts 3 and 4 are disposed at a lower side from the center of a surface of liquid crystal panel 2. This is because, in the case of the ducts extended in the vertical direction like smokestacks, wind is blown diagonally upward from the openings in the side surfaces of the upper portions of the ducts.

Further, in order to cool the liquid crystal panel which generates heat by absorption of light or the like efficiently, enhancement in the heat transfer rate between the liquid crystal panel and the cooling wind, and reduction in the temperature of the atmosphere around the liquid crystal panel are important.

In order to enhance the heat transfer rate, blowing cooling wind at a high speed into the liquid crystal panel, and disturbing the cooling wind in the center of the liquid crystal panel as in FIG. 1 are effective. In order to lower the temperature of the atmosphere around the liquid crystal panel, increasing the amount of wind is necessary.

In the present invention, the cooling wind is blown from the three spots around the liquid crystal panel, and therefore, the cooling winds which interfere with one another in the center of the liquid crystal panel have nowhere to go, and are agitated to enhance the aforementioned heat transfer rate. The temperature reduction effect by enhancement of the heat transfer rate is about 2° C.

Meanwhile, the cooling wind causes a temperature rise after the cooling wind reaches the liquid crystal panel until it passes through the liquid crystal panel, but in the present invention, substantially the same wind amounts are blown from the three spots around the liquid crystal panel. Therefore, the ambient temperature rise around the center of the liquid crystal panel can be suppressed to ⅓ as compared with the wind which is blown from only one spot. The temperature reduction effect generated by an increase in the wind amount is about 6° C.

By the enhancement of the aforementioned heat transfer rate and suppression of the aforementioned ambient temperature rise as above, the temperature of the center of the liquid crystal panel can be reduced by 8° C.

In the present invention, wind is blown from the three spots around the liquid crystal panel which is the optical part, but even when wind is blown from two spots by removing one of the ducts at both the left and right sides of the liquid crystal panel, the effect equivalent to the case of blowing winds from the three spots can be obtained. However, the cooling effect is smaller than in the case of blowing winds from the three spots, and the amount of reduction of the temperature of the center of the liquid crystal panel is about 5° C.

Figure 3:
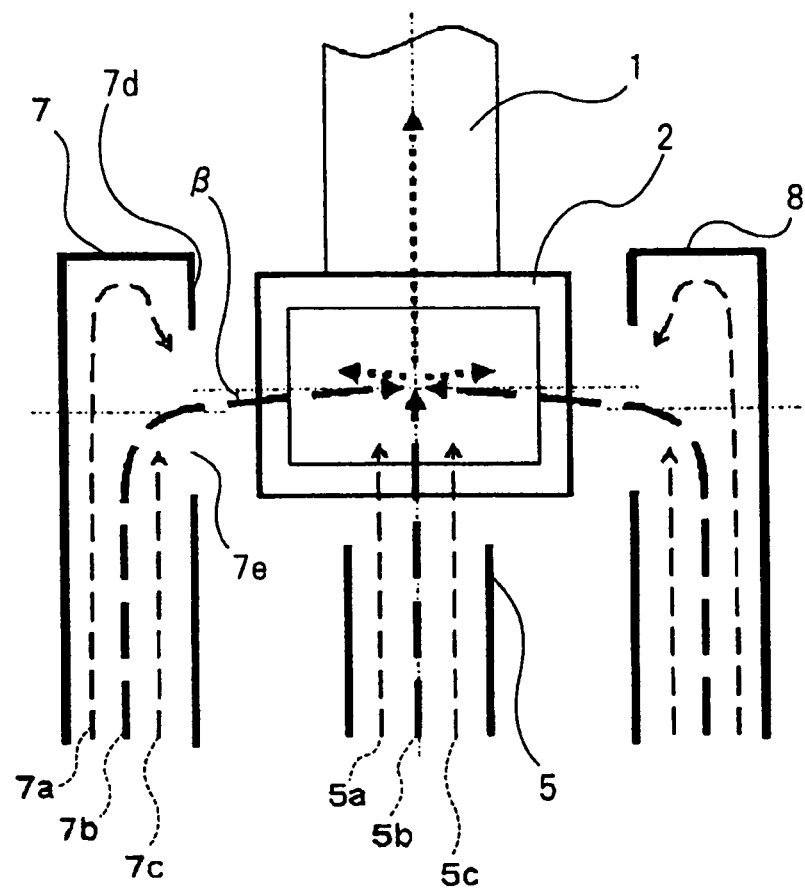
FIG. 3 is a sectional view showing a modified example of the cooling duct when the liquid crystal panel is seen from the optical axis direction (light transmitting direction)

Further, FIG. 3 shows the cooling structure in which the angle (angle β) of the cooling wind blown to the center of liquid crystal panel 2 from each of the openings (wind outlets) in the upper side surfaces of the smokestack-shaped ducts (smokestack ducts 7 and 8) at both the left and right sides of the liquid crystal panel is made smaller than the angle (angle α) of the cooling wind by the wind duct of FIG. 1, and the angle formed by the opposite directions in which wind is blown from smokestack duct 7 and smokestack duct 8 is made close to 180°. The angle α or β of the wind indicates the angle relative to the phantom line in the direction orthogonal to the direction in which wind is blown from duct 5 through the center of liquid crystal panel 2.

In order to make the angle from which wind is blown small like this, spaces surrounded by upper end walls and side walls of smokestack ducts 7 and 8 are formed at the upper sides from the open ends of the openings (wind outlets) of smokestack ducts 7 and 8 in the cooling structure of FIG. 3. In other words, side wall 7d of the duct is provided between an upper end of each of smokestack ducts 7 and 8 and each of the open ends of the wind outlets so that the upper end of each of smokestack ducts 7 and 8 does not become the open end of the wind outlet.

By adopting such a shape, wind flows 7a, 7b, 7c and the like advance in smokestack duct 7 to the upper side from the lower side, for example, and wind flow 7a which is a part of the wind flows turns back at the upper end surface and side wall 7d of smokestack duct 7a and advances to the lower side. Therefore, wind flow 7b coming from the wind outlet (opening 7e) of smokestack duct 7 tends to go in the direction along the center line of the wind outlet.

In contrast with this shape, in the structure of FIG. 1, opening 3d of the wind outlet is formed from the upper end of smokestack duct 3, and therefore, flow 3a which is a part of wind flows 3a, 3b, 3c and the like which advance in smokestack duct 3 to the upper side from the lower side does not interfere with wind flows 3b and 3c which advance to the wind outlet. Therefore, wind flow 3b coming from the wind outlet tends to be inclined sharply relative to the center line of the wind outlet (see angle α of FIG. 1).

Meanwhile, as in FIG. 3, angle β of the cooling wind to the center of liquid crystal panel 2 from each of the centers of the openings of smokestack ducts 7 and 8 is made close to 0°, whereby agitation of the cooling winds occurring in the center of the liquid crystal panel becomes large, and the heat transfer rate between the liquid crystal panel and the cooling wind can be enhanced efficiently.

Figure 4:
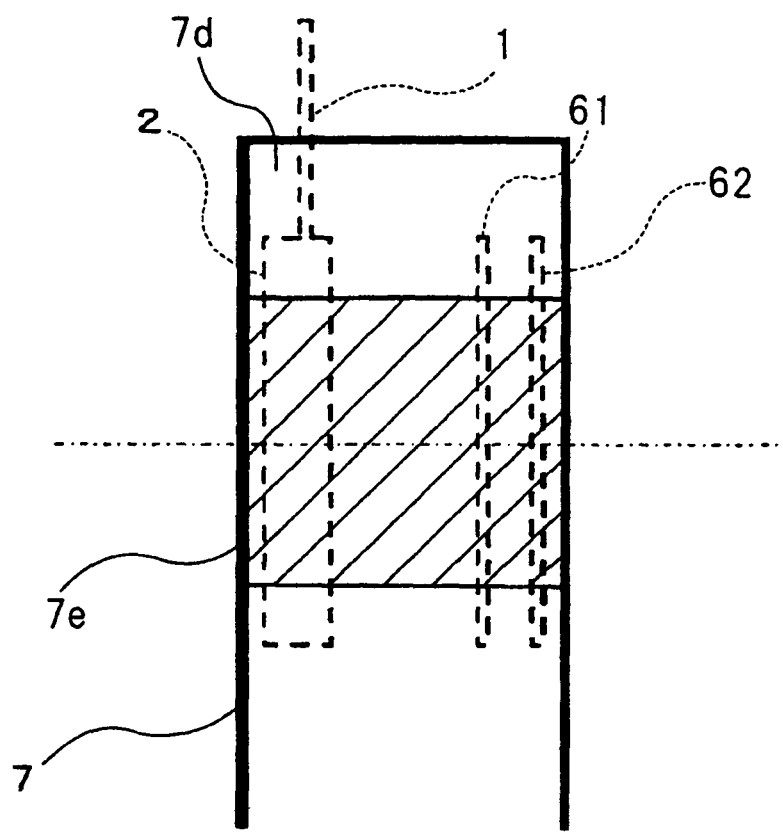
FIG. 4 is a view of an opening of a smokestack duct disposed at both left and right sides of the liquid crystal panel of FIG. 3, seen from the side of the liquid crystal panel.

FIG. 3 is a section of the cooling duct when liquid crystal panel 2 is seen in the optical axis direction (light transmission direction) as in FIG. 1, and the route from which the cooling wind is blown to liquid crystal panel 2 is shown by the dotted lines. FIG. 4 is opening 7e in the side surface of smokestack duct 7 disposed at each of both the left and right sides of liquid crystal panel 2 of FIG. 3, seen from the side of liquid crystal panel 2 as in FIG. 2.

Figure 5:
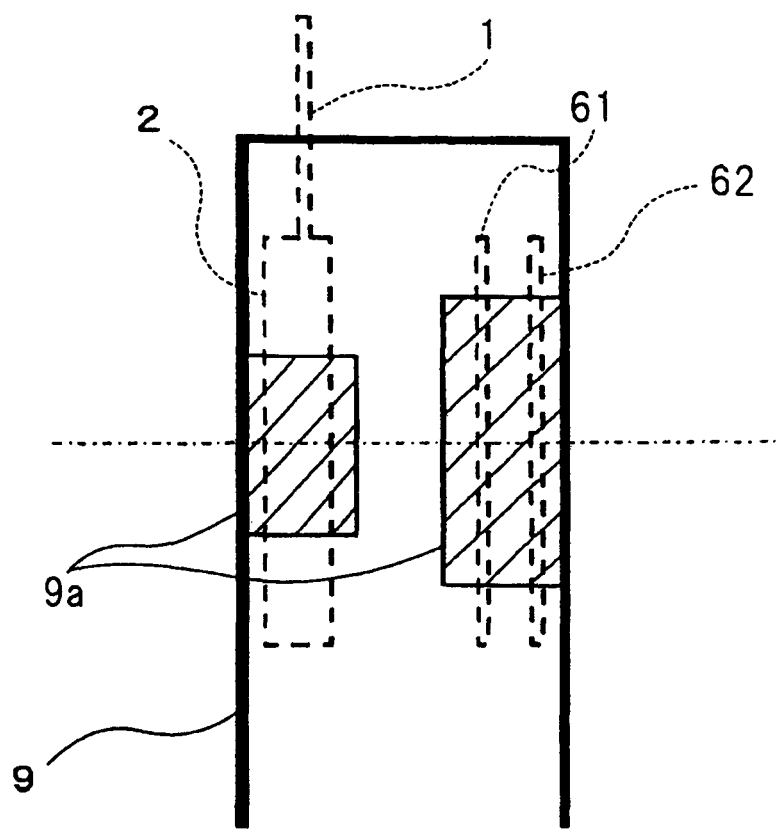
FIG. 5 is a view showing an example of optimally adjusting the opening of the duct disposed at a lateral side of an optical part to be cooled.

Further, the structure of FIG. 5 is the result of optimally adjusting the openings in the side surfaces of the ducts (smokestack ducts 3, 4, 7 and 8 of FIGS. 1 to 4) disposed at the lateral sides of the optical parts in accordance with the amount of heat that is generated and the thermal diffusion performance of the optical parts (for example, the liquid crystal panel and the polarizing plate) to be cooled.

As shown in FIG. 5, from openings 9a of smokestack duct 9 which are disposed at the lateral sides of liquid crystal panel 2 and polarizing plates 61 and 62 which are optical parts, cooling winds are blown to the central portion for liquid crystal panel 2, and to a wide range including the central portions, lower portions and upper portions for polarizing plates 61 and 62.

This is because polarizing plates 61 and 62 have a high thermal diffusion performance because of the use of crystal with a high heat transfer rate for the substrates, and therefore, even if the wind velocity is reduced, the wind is desirably blown over a wide range. Further, heat generating parts do not exist between liquid crystal panel 2 and polarizing plate 61, and therefore, an opening is not provided. By configuring the cooling structure like this, the present invention can realize efficient cooling locally.

Figure 6:
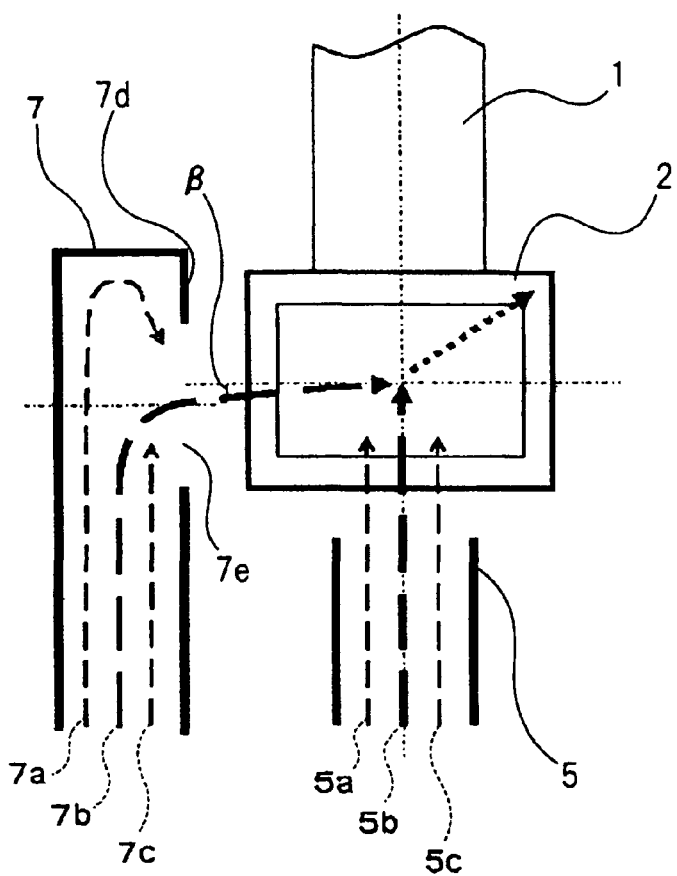
FIG. 6 is a view showing an example of adopting only one side of a structure that blows wind from both the left and right sides of the liquid crystal panel as shown in FIG. 3.

Further, the structure of FIG. 6 adopts one side of the structure that blows wind from both the left and right sides of the liquid crystal panel as shown in FIG. 3.

In this case, agitation in the center of the liquid crystal panel is weak as compared with wind blown from the three spots around the liquid crystal panel, the amount of wind distributed to the liquid crystal panel drops to ⅔, and therefore, the cooling effect is reduced. However, the space surrounded by the upper end wall and the side wall of smokestack duct 7 is formed above the open end of the opening (wind outlet) of smokestack duct 7, and therefore, angle of the cooling wind blown forth from the wind outlet is substantially 0°. Therefore, the interference angle of the cooling wind blown to the center of the liquid crystal panel from the wind outlet, and the cooling wind blown from the lower portion of the liquid crystal panel from duct 5 becomes close to 90°.

Hereinafter, the first to fourth exemplary embodiments will be shown to describe the present invention concretely, and the same components are assigned with the same reference numerals and characters in each of the descriptions.

(First Exemplary Embodiment)

Figure 7:
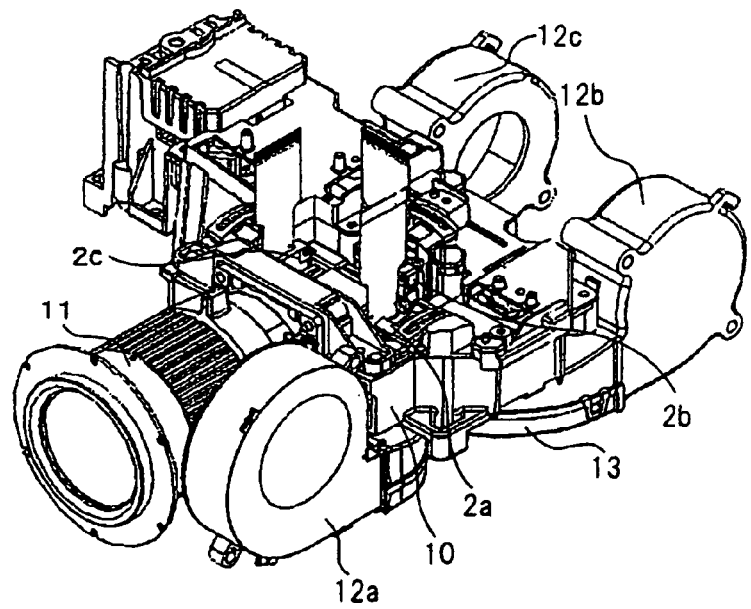
FIG. 7 is a perspective view showing an internal structure with respect to a projection display apparatus including a cooling duct according to a first exemplary embodiment.

FIG. 7 is a perspective view showing the internal structure with respect to the projection display apparatus including the cooling duct according to a first exemplary embodiment.

The projecting display apparatus of the present exemplary embodiment includes a light source such as a discharge lamp like an extra-high pressure mercury lamp, an LED, and a laser, a color separation optical system which performs color separation of the light of the light source into R, G and B, optical engine 10 loaded with a color synthesizing system which generates video for each color, and projection lens 11 which enlarges and projects the video.

The color separation optical system is configured by a mirror, a reflection mirror and the like, and light that passes through the optical parts (PBS), which aligns polarized light, from the light source is incident on the color separation optical system.

The color synthesizing system is configured by liquid crystal panels 2a to 2c and the like used as light valves. Each of the liquid crystal panel units generates heat by absorption of the transmitting light, and therefore, is cooled by the cooling winds sent forth to the liquid crystal panel unit by using sirocco fan 12a, sirocco fan 12b and sirocco fan 12c.

Sirocco fan 12a cools liquid crystal panel 2a from lower side via wind duct 13. Sirocco fan 12b cools liquid crystal panel 2b from lower portion via wind duct 13, and simultaneously blows a cooling wind to the end surface at one side of liquid crystal panel 2b by smokestack duct 13a which will be described later.

Sirocco fan 12c cools liquid crystal panel 2c from the lower portion via wind duct 13, simultaneously cools liquid crystal panel 2c from the end surface side of liquid crystal panel 2c, and cools liquid crystal panel 2b from the end surface side of liquid crystal panel 2b, by smokestack duct 13b which will be described later.

By the above configuration, liquid crystal panel 2a is cooled from the lower portion, liquid crystal panel 2b is cooled from the lower side and both the end surface sides, and liquid crystal panel 2c is cooled from the lower side and an end surface side at one side.

Figure 8:
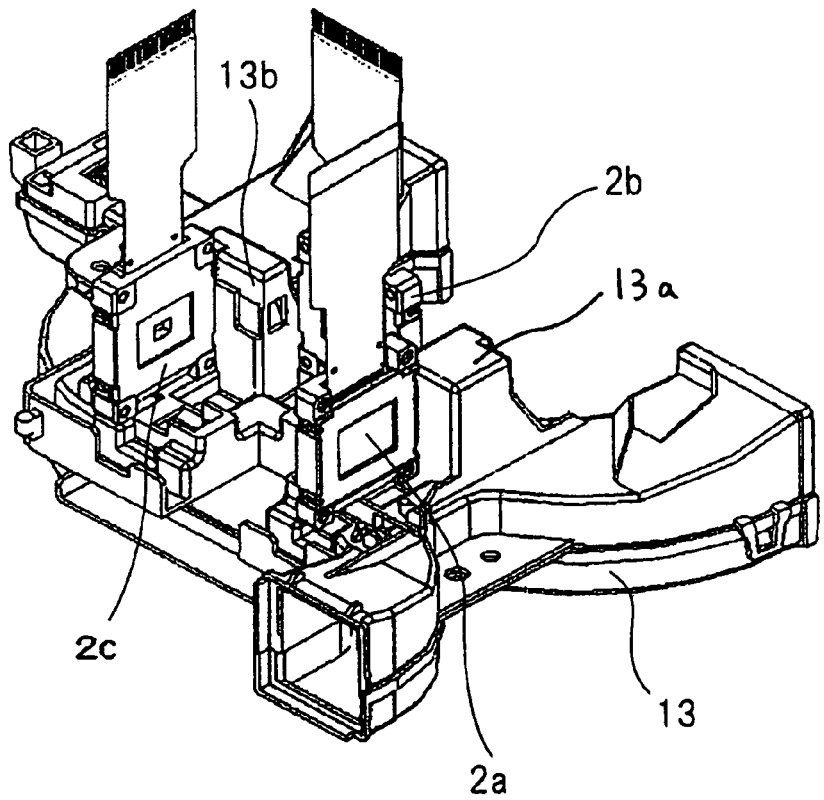
FIG. 8 is a view showing wind duct 13, smokestack ducts 13a and 13b each projected in the shape of a smokestack in the direction of an upper portion from wind duct 13, and liquid crystal panels 2a to 2c, with optical engine 10, projection lens 11 and sirocco fans 12a to 12c omitted.

FIG. 8 shows wind duct 13, smokestack ducts 13a and 13b, each projected in the shape of a smokestack in the upper direction from wind duct 13, and liquid crystal panels 2a to 2c, with optical engine 10, projection lens 11 and sirocco fans 12a to 12c omitted from FIG. 7. Smokestack ducts 13a and 13b are provided upward from a top surface of wind duct 13 like smokestacks which communicate with the inside of wind duct 13.

Wind duct 13 is disposed at the lower portion of optical engine 10, and guides cooling winds from sirocco fans 12a to 12c to the lower portions and the left and right end portions of liquid crystal panels 2a to 2c by a wind guide partition provided in wind duct 13. The guided cooling wind is blown from the lower portion of each of liquid crystal panels 2a to 2c, and is simultaneously blown to liquid crystal panel 2b from both the end surface sides and is blown to liquid crystal panel 2c from the end surface at one side.

Figure 9:
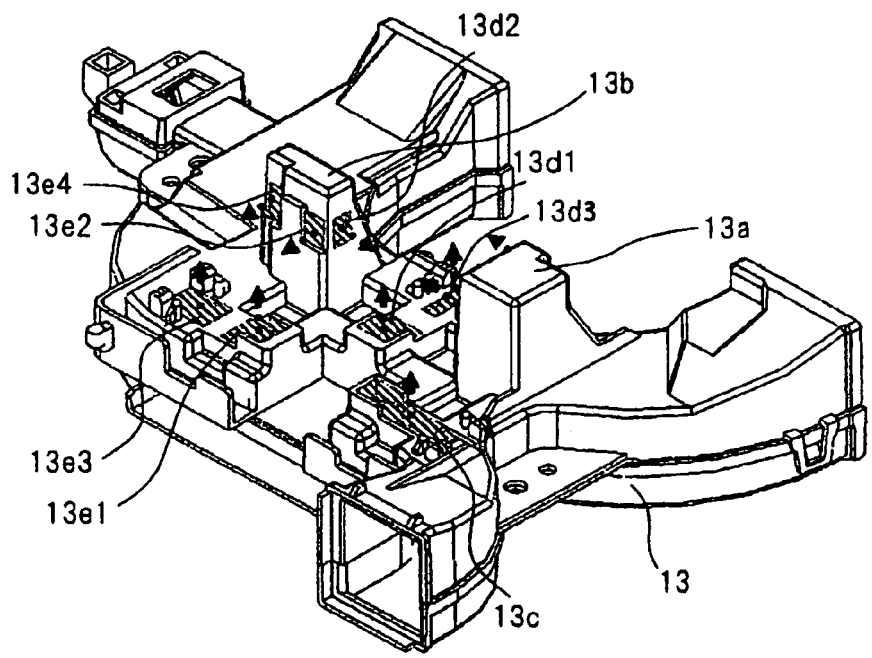
FIG. 9 is a view showing wind duct 13 only, with liquid crystal panels 2a, 2b and 2c omitted from FIG. 8.
Figure 10:
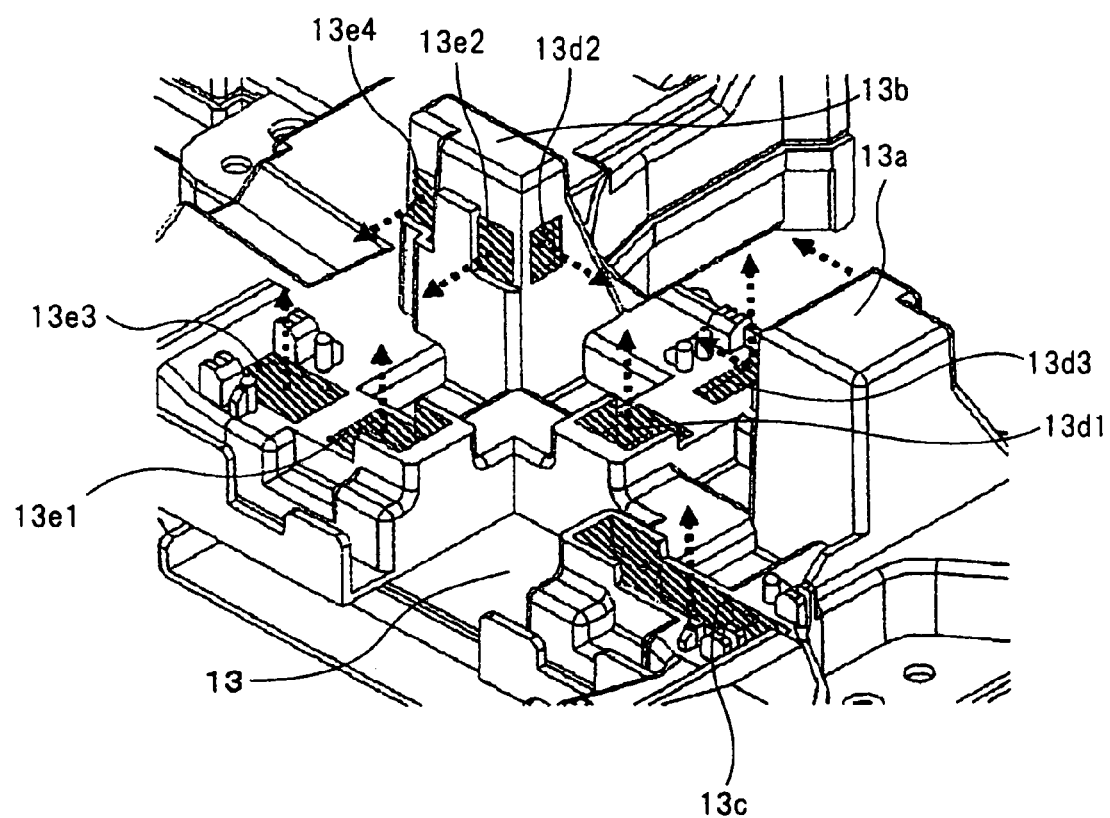
FIG. 10 is an enlarged view of FIG. 9.

FIG. 9 shows wind duct 13 with liquid crystal panels 2a, 2b and 2c omitted from FIG. 8, and FIG. 10 is an enlarged view of it. The wind outlets (openings) of wind duct 13 are shown by the oblique lines, and the direction of the wind that is blown to each of the liquid crystal panels from the wind outlet is shown by the dotted arrow.

Liquid crystal panel 2a is cooled by the wind advancing in the upper direction from wind outlet 13c provided in the top surface of wind duct 13.

Liquid crystal panel 2b is cooled by the wind advancing in the upper direction from wind outlet 13d1 provided in the top surface of wind duct 13. Simultaneously with this, liquid crystal panel 2b is cooled by the wind advancing to one end surface of liquid crystal panel 2b from the wind outlet (not illustrate) of smokestack duct 13a, and is cooled by the wind advancing to another end surface of liquid crystal panel 2b from wind outlet 13d2 of smokestack duct 13b. For the cooling state, refer to the conceptual view of FIG. 3.

Liquid crystal panel 2c is cooled by the wind advancing in the upward direction from wind outlet 13e1 provided in the top surface of wind duct 13, and is simultaneously cooled by the wind advancing to one end surface of liquid crystal panel 2c from wind outlet 13e2 of smokestack duct 13b. For the cooling state, refer to the conceptual view of FIG. 6.

The polarizing plates and the like (polarizing plates and optical compensation plates) are also disposed at the light incident sides of liquid crystal panels 2a, 2b and 2c, and cooling similar to the liquid crystal panels is also performed for them.

The polarizing plate and the like (polarizing plate and the optical compensation plate) disposed at the light incident side of liquid crystal panel 2a are cooled by the wind advancing in the upward direction from wind outlet 13c provided in the top surface of wind duct 13.

The polarizing plate and the like disposed at a light incident side of liquid crystal panel 2b is cooled by the wind advancing in the upward direction from wind outlet 13d3 provided in the top surface of wind duct 13, and is simultaneously cooled by the wind advancing to one end surface of liquid crystal panel 2b from a wind outlet (not illustrated) of smokestack duct 13a.

The polarizing plate and the like disposed at the light incident side of liquid crystal panel 2c are cooled by the wind advancing in the upward direction from wind outlet 13e provided in the top surface of wind duct 13, and is simultaneously cooled by the wind advancing to one end surface of liquid crystal panel 2c from wind outlet 13e4 of smokestack duct 13b.

The central temperature of liquid crystal panel 2b can be reduced by about 8° C. in the present exemplary embodiment.

(Second Exemplary Embodiment)

Figure 11:
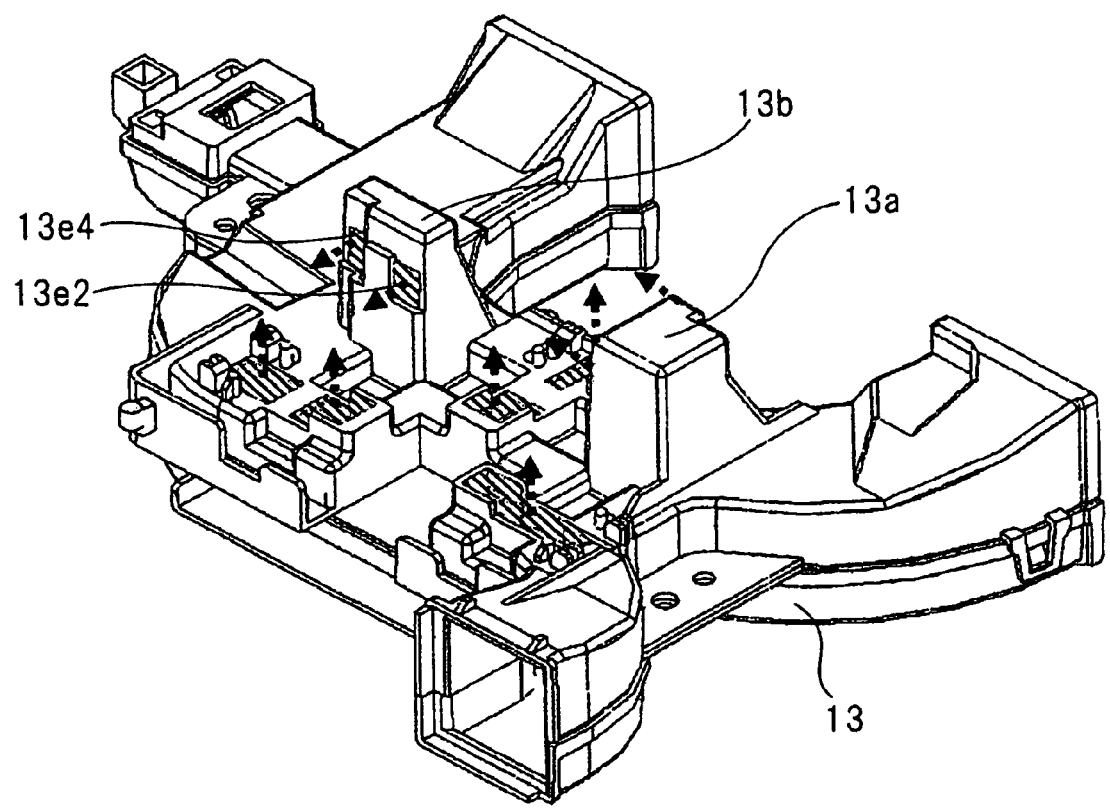
FIG. 11 is a view showing a cooling duct according to a second exemplary embodiment.

FIG. 11 shows a cooling duct according to a second exemplary embodiment. In FIG. 11, wind outlets (openings) of wind duct 13 are shown by the oblique lines, and the directions of the winds which are blown to the respective liquid crystal panels from the wind outlet are shown by the dotted line arrows.

The present exemplary embodiment is used for an optical engine in which liquid crystal panel 2c is disposed in a blue optical path, and liquid crystal panel 2c (blue) is cooled first.

Referring to FIG. 11, wind outlet 13d2 of smokestack duct 13b in the cooling structure of FIG. 10 showing the first exemplary embodiment is not provided. Thereby, the amount of wind that is blown from other wind outlets 13e2 and 13e4 of smokestack duct 13b are increased more than the cooling structure of FIG. 10.

More specifically, both liquid crystal panel 2b and liquid crystal panel 2c are cooled from two-directions (see FIG. 6), that is, cooled from the lower side of the panel and cooled from the side portion of the panel, and the cooling performance for liquid crystal panel 2c is enhanced by sacrificing the cooling performance for liquid crystal panel 2b.

Meanwhile, the cooling performance for liquid crystal panel 2b is reduced as compared with the case in which the liquid crystal panel 2b is cooled from the three directions, that is, cooled from the lower side of the panel and both the left and right sides of the panel as in FIG. 1, but the heat transfer rate is enhanced more than that of the related art, and the temperature of the atmosphere around the liquid crystal panel is lowered. Therefore, the temperature of liquid crystal panel 2b is lowered. In the present exemplary embodiment, the central temperature of liquid crystal panel 2b can be reduced by about 5° C.

(Third Exemplary Embodiment)

Figure 12:
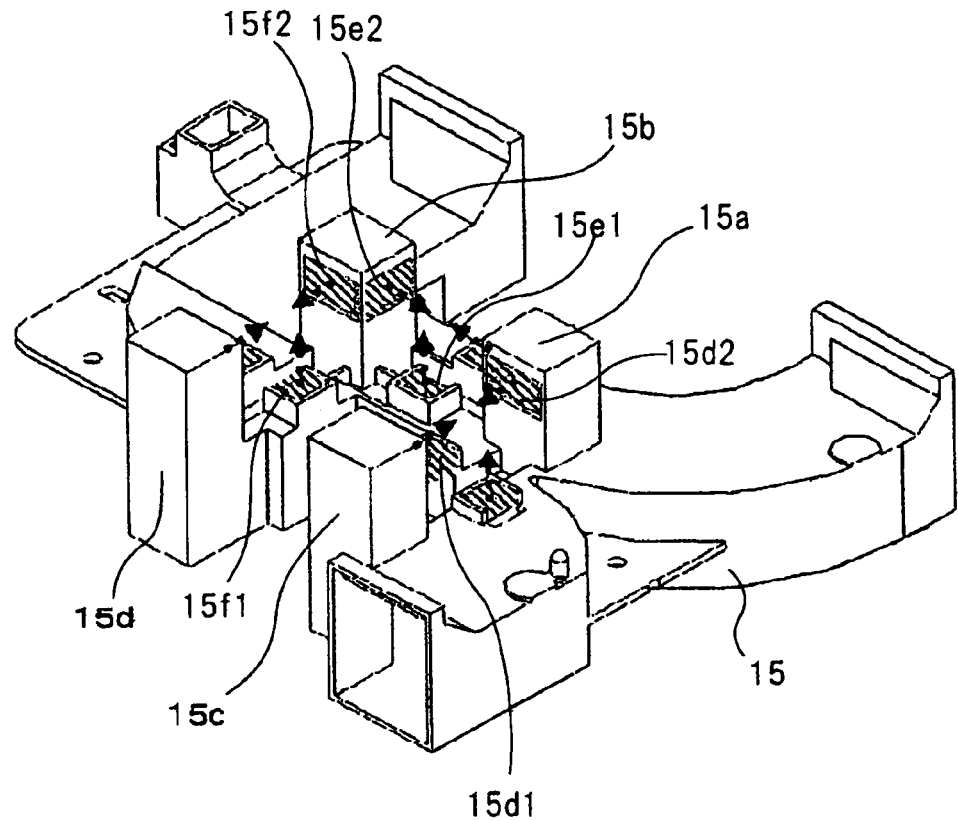
FIG. 12 is a view showing a cooling duct which realizes cooling from three directions in all three liquid crystal panels, as a third exemplary embodiment.

FIG. 12 shows a cooling duct which realizes cooling from three directions in all liquid crystal panels 2a to 2c as a third exemplary embodiment. Wind duct 15 shown in the drawing corresponds to wind duct 13 for blowing winds by sirocco fans 12a to 12c to liquid crystal panels 2a to 2c of the projection display apparatus described in the first exemplary embodiment, although wind duct 15 differs somewhat in shape from that in the aforementioned exemplary embodiments.

Four ducts (smokestack ducts 15a to 15d), each in the shape of a smokestack, are provided upward from a top surface of wind duct 15, and communicate with the inside of wind duct 15. These smokestack ducts 15a to 15d realize cooling of liquid crystal panels 2a to 2c with winds from the three directions around them.

In FIG. 12, the wind outlets (openings) of wind duct 13 are shown by oblique lines, and the wind directions of the wind blown to the respective liquid crystal panels from the wind outlets are shown by dotted arrows.

More specifically, in the case of the present exemplary embodiment, liquid crystal panel 2a is cooled by the wind in the upward direction from opening 15d1 provided in the top surface of wind duct 15, and is simultaneously cooled by the winds from opening 15d2 of smokestack duct 15a and the opening (not illustrated) of smokestack duct 15c which are disposed at both the left and right sides of liquid crystal panel 2a.

Liquid crystal panel 2b is cooled by wind in the upward direction from opening 15c1 provided in the top surface of wind duct 15, and is simultaneously cooled by winds from an opening (not illustrated) of smokestack duct 15a and opening 15e2 of smokestack duct 15b which are disposed at both the left and right sides of liquid crystal panel 2b.

Liquid crystal panel 2c is cooled by wind in the upward direction from opening 15f1 provided in the top surface of wind duct 15, and is simultaneously cooled by the winds from opening 15f2 of smokestack duct 15b and opening (not illustrated) of smokestack duct 15d which are respectively disposed at both the left and right sides of liquid crystal panel 2b.

The present exemplary embodiment can enhance the cooling performance for the liquid crystal panel more than the aforementioned first and second exemplary embodiments.

(Fourth Exemplary Embodiment)

Figure 13:
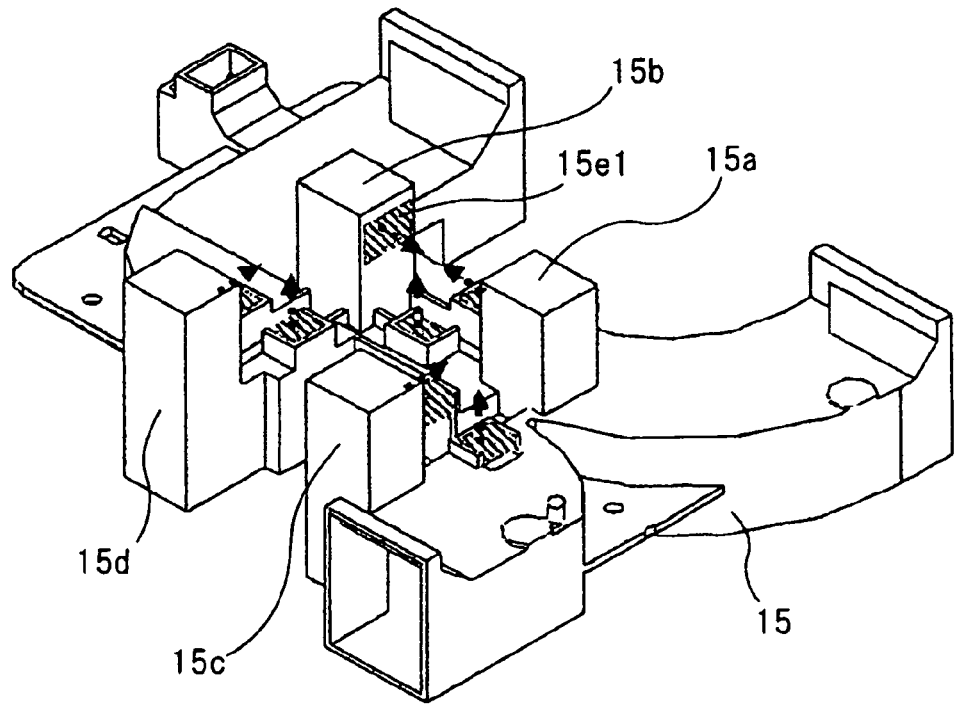
FIG. 13 is a view which realizes cooling in two directions for two liquid crystal panels without reducing the cooling performance of the liquid crystal panels, as a fourth exemplary embodiment.

FIG. 13 shows a cooling duct according to a fourth exemplary embodiment.

In the second exemplary embodiment shown in FIG. 11, the cooling performance for liquid crystal panel 2b needs to be reduced for strengthening cooling for liquid crystal panel 2c. More specifically, in smokestack duct 13b (see FIG. 11) which can be commonly used for end surfaces at one side of liquid crystal panels 2b and 2c, the wind outlet for the end surface at one side of liquid crystal panel 2b is not provided, and the wind outlet for the end surface at one side of liquid crystal panel 2c is provided.

However, in the present exemplary embodiment, as shown in FIG. 13, in smokestack duct 15b which can be commonly used for the end surfaces at one side of liquid crystal panels 2b and 2c, the wind outlet for the end surface at one side of liquid crystal panel 2b is kept, and the wind outlet for the end surface at one side of liquid crystal panel 2c is not provided. Instead, wind to liquid crystal panel 2c is supplied from smokestack duct 15d which is individually provided.

Similarly, in smokestack duct 15a which can be commonly used for end surfaces at one side of liquid crystal panels 2a and 2b, the wind outlet for the end surface at one side of liquid crystal panel 2b is kept, and the wind outlet for the end surface at one side of liquid crystal panel 2a is not provided. Instead, the wind blown to liquid crystal panel 2a is supplied from smokestack duct 15c which is individually provided.

Such a mode can simultaneously realize cooling in the two directions for liquid crystal panel 2a and liquid crystal panel 2c without reducing the cooling performance for liquid crystal panel 2b.

The invention of the present application is described with reference to several exemplary embodiments above, but the invention of the present application is not limited to the above described exemplary embodiments. Various modifications which a person skilled in the art can understand can be made for the shape and details of the invention of the present application within the range of the technical idea of the invention of the present application.

The invention claimed is:

1. A projection display apparatus comprising a cooling structure for an optical part, said cooling structure comprising:
   a first wind outlet for blowing a first cooling wind so that the first cooling wind passes along said optical part; and
   a second wind outlet which is provided at a location different from a location of said first wind outlet and which is for blowing a second cooling wind so as to allow the second cooling wind to interfere with the first cooling wind from said first wind outlet at said optical part,
   wherein a first duct is provided at a lower side, in a gravity direction, of said optical part, said first duct having said first wind outlet opened in a top surface, in the gravity direction,
   wherein a second duct is provided in a shape of a smokestack along an upper portion, in the gravity direction, from a lower portion, in the gravity direction, of an end surface of one side or end surfaces of both sides of said optical part, having said second wind outlet opened in a side surface,
   wherein said optical part comprises a liquid crystal panel unit used as a light valve, the liquid crystal panel units being provided to correspond to three colors of red, green, and blue, and two of said second duct are provided,
   wherein one of the two second ducts is disposed to correspond to an end surface at one side of end surfaces at both sides of said liquid crystal panel unit used for one color, and to an end surface at one side of said liquid crystal panel unit used for one of remaining two colors, and
   wherein another one of said two second ducts is disposed to correspond to the end surface at another side of the end surfaces at both sides of said liquid crystal panel unit used for said one color, and to an end surface at one side of said liquid crystal panel unit used for another color of said remaining two colors.

2. The projection display apparatus according to claim 1, wherein each of said two second ducts is provided with one or a plurality of said second wind outlets to correspond to the end surface at the one side of said liquid crystal panel unit.

3. The projection display apparatus according to claim 1, wherein two of said second ducts are further provided to correspond to the end surface at said another side of said liquid crystal panel unit used for the one color of said remaining two colors, and to the end surface at said another side of said liquid crystal panel unit used for the other color of said remaining two colors.

* * * * *